United States Patent
Liou

(10) Patent No.: US 6,950,413 B1
(45) Date of Patent: Sep. 27, 2005

(54) MUTUALLY-ASSISTED PROXIMITY INFORMER SYSTEM AND METHOD WITH WIRELESS DEVICES

(76) Inventor: Jenn-Chorng Liou, 4Fl., No.346, Guangming 5th St., Jubei City, Hsinchu (TW) 302

( * ) Notice: Subject to any disclaimer, the term of this patent is extended or adjusted under 35 U.S.C. 154(b) by 1179 days.

(21) Appl. No.: 09/620,468

(22) Filed: Jul. 20, 2000

(51) Int. Cl.⁷ .............................................. H04J 3/24
(52) U.S. Cl. .................... 370/312; 370/338; 370/432
(58) Field of Search ............................... 370/276, 279, 370/293, 315, 321, 328, 338, 400, 401, 464, 370/465, 312, 913, 432; 455/11.1

(56) References Cited

U.S. PATENT DOCUMENTS 5,610,595 A * 3/1997 Garrabrant et al. .... 340/825.52
5,898,679 A * 4/1999 Brederveld et al. ......... 370/315

FOREIGN PATENT DOCUMENTS

| EP | 0401974 | * | 12/1990 |
| GB | 2330733 | * | 4/1999 |
| GB | 2342543 | * | 4/2000 |
| WO | WO 96/22636 | * | 7/1996 |

* cited by examiner

Primary Examiner—Frank Duong
(74) Attorney, Agent, or Firm—Rabin & Berdo, P.C.

(57) ABSTRACT

Disclosed is a mutually-assisted proximity informer system and method with wireless devices, by which a message contained in a message unit is received/transmitted between a plurality of wireless devices with a relay process. An original message unit of a frame format embedded with an ID, a message/status and a relay sequence is generated and issued by one of the plurality of wireless devices and is then received and retransmitted voluntarily one by one with others of the plurality of wireless devices until a termination of the relay process of the message unit, in which the relay sequence is constantly incremented before the termination of the relay process for the delivery of the message. A simple message delivery to a longer distance far away is obtained by means of wireless devices even of a short or a limited communication range. Encryption for security and reliability and establishment of a communication tunnel are also provided by specific implantation into the message unit and operations.

40 Claims, 8 Drawing Sheets

| | Preamble 31 | ID 32 | Message/Status 33 | | | Relay Sequence 34 | First Relay Location Marker 35 | Retransmit Canceling 36 | Tunnel Established 37 | |
|---|---|---|---|---|---|---|---|---|---|---|
| | | | Public Annotation 331 | Private 332 | Session Key 334 | | | | | |
| Transmitter | 0101 | AMY T. | 111 | I AM SAFE. | KEYAA | 0 | — | — | 0 | |
| | 0101 | AMY T. | S8RYMO%L#K/@LL7MQP | | | 0 | — | — | 0 | |
| 1st Station | 0101 | AMY T. | S8RYMO%L#K/@LL7MQP | | | 1 | 7 FOX ST | — | 0 | forward relay |
| 2nd Station | 0101 | AMY T. | S8RYMO%L#K/@LL7MQP | | | 2 | 7 FOX ST | — | 0 | |
| 3rd Station | 0101 | AMY T. | S8RYMO%L#K/@LL7MQP | | | 3 | 7 FOX ST | — | 0 | |
| ⋮ | | | | | | | | | | |
| 11th Station (Base) | 0101 | AMY T. | S8RYMO%L#K/@LL7MQP | | | 11 | 7 FOX ST | — | 0 | |
| | 0101 | AMY T. | 111 | I AM SAFE. | KEYAA | 11 | 7 FOX ST | — | 0 | |
| | 0101 | AMY T. | S8RYMO%L#K/@LL7MQP | | | — | 7 FOX ST | KEYAA | 0 | |
| 10th Station | 0101 | AMY T. | S8RYMO%L#K/@LL7MQP | | | — | 7 FOX ST | KEYAA | 0 | |
| 9th Station | 0101 | AMY T. | S8RYMO%L#K/@LL7MQP | | | — | 7 FOX ST | KEYAA | 0 | reverse relay |
| 8th Station | 0101 | AMY T. | S8RYMO%L#K/@LL7MQP | | | — | 7 FOX ST | KEYAA | 0 | |
| ⋮ | | | | | | | | | | |
| Transmitter | 0101 | AMY T. | 111 | I AM OK. | KEYBB | 0 | — | — | 1 | |
| | 0101 | AMY T. | I$(QZ<9WRYZIIP\L+R | | | 0 | — | — | 1 | |
| | 0101 | AMY T. | I$(QZ<9WRYZIIP\L+R | | | 0 | 13 AL RD | — | 1 | |

| | Preamble (31) | ID (32) | Message/Status (33) | | | Relay Sequence (34) | First Relay Location Marker (35) | Retransmit Canceling (36) | Tunnel Established (37) |
|---|---|---|---|---|---|---|---|---|---|
| | | | Public Annotation (331) | Private (332) | Session Key (334) | | | | |
| Transmitter | 0101 | AMY T. | 111 | I AM SAFE. | KEYAA | 0 | — | — | 0 |
| 1st Station | 0101 | AMY T. | | S8RYM0%L#K/@LL7MQP | | 0 | — | — | 0 |
| 2nd Station | 0101 | AMY T. | | S8RYM0%L#K/@LL7MQP | | 1 | 7 FOX ST | — | 0 |
| 3rd Station | 0101 | AMY T. | | S8RYM0%L#K/@LL7MQP | | 2 | 7 FOX ST | — | 0 |
| ⋮ | | | | | | | | | |
| 11th Station (Base) | 0101 | AMY T. | 111 | I AM SAFE. | KEYAA | 3 | 7 FOX ST | — | 0 |
| 10th Station | 0101 | AMY T. | | S8RYM0%L#K/@LL7MQP | | 11 | 7 FOX ST | — | 0 |
| 9th Station | 0101 | AMY T. | | S8RYM0%L#K/@LL7MQP | | 11 | 7 FOX ST | KEYAA | 0 |
| 8th Station | 0101 | AMY T. | | S8RYM0%L#K/@LL7MQP | | — | 7 FOX ST | KEYAA | 0 |
| ⋮ | | | | | | | | | |
| Transmitter | 0101 | AMY T. | 111 | I AM OK. | KEYBB | 0 | — | — | 1 |
| | 0101 | AMY T. | | I$(QZ<9WRYZIIP\L+R | | 0 | — | — | 1 |
| | 0101 | AMY T. | | I$(QZ<9WRYZIIP\L+R | | 0 | 13 AL RD | — | 1 | forward relay → reverse relay →

Fig. 6

MUTUALLY-ASSISTED PROXIMITY INFORMER SYSTEM AND METHOD WITH WIRELESS DEVICES

FIELD OF THE INVENTION

The present invention is directed to a system and method for wireless communication, and more particularly, to a mutually-assisted proximity informer system and method with wireless devices.

BACKGROUND OF THE INVENTION

Wireless communications are very commonly practiced on point-to-point transmission bases. For instance, messages are transmitted from A to B or between A and B. However, wireless communication is limited by its physical principles and by the legal regulations of emission power. As a result, the communication is restricted within a regular range. In general, the range of home cordless devices are within 20 to 50 meters, so that it is inconvenient and unreliable for many simple, local, or community-based applications, such as the automobile anti-thief device, children's SOS handset, fire alarm, security alarm and the instant messenger for the arrival of the garbage truck, etc.

Common practices that extend the ranges of communications are utilizing the public switching telephone network (PSTN) or establishing licensed radio channels for the wireless communication. However, these two solutions will either need to apply for licenses or need to pay to the network carriers. Moreover, the devices designed for these cases are technically more complicated, and require higher cost.

It is therefore desired a system and method for community-based wireless communication network under the considerations of convenience and cost.

SUMMARY OF THE INVENTION

In accordance with one aspect of the present invention, it is provided a mutually-assisted proximity informer system and method with wireless devices.

In accordance with another aspect of the present invention, it is provided a message frame format for wireless communication, which comprises a specific field for controlling the start and termination of message delivery.

In accordance with still another aspect of the present invention, a wireless communication system and method with encryption for security and reliability is described.

In accordance with one further aspect of the present invention, a wireless communication system and method with confirmation of a relayed message is disclosed.

In accordance with still yet another aspect of the present invention, it is disclosed a wireless communication system and method of better frequency spectrum efficiency with an established communication tunnel.

According to the present invention, a mutually-assisted proximity informer system and method with wireless devices is realized with the transmission of a message unit of frame format, which is embedded with an ID, a message/status and a relay sequence in fields of the frame, between a plurality of wireless devices. The relay sequence count is incremented during the relay process until the termination of the relay. Data transmitted by the message unit is optionally encrypted for the purpose of security and reliability.

In addition, an echo message unit can be delivered to establish a communication tunnel for an original message whenever the original message reaches its destination, by which unnecessary waste of spectrum resources for the same message is avoided and thus the communication system becomes more spectrum efficient.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 6 shows the status of a message unit during the relay process;

DESCRIPTION OF THE PREFERRED EMBODIMENTS

Figure 1:
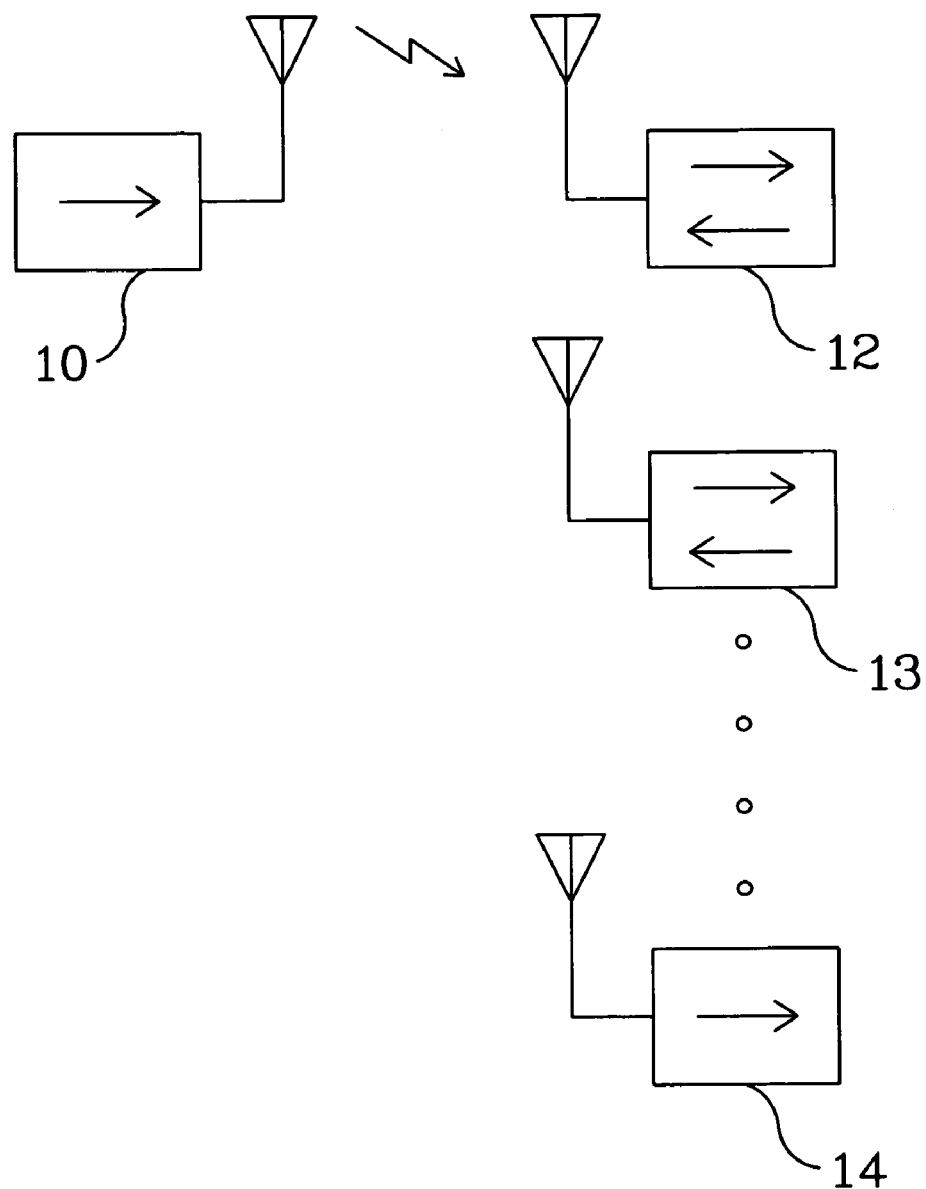
FIG. 1 shows a system with a plurality of wireless devices for illustration of the relay between them.
Figure 2:
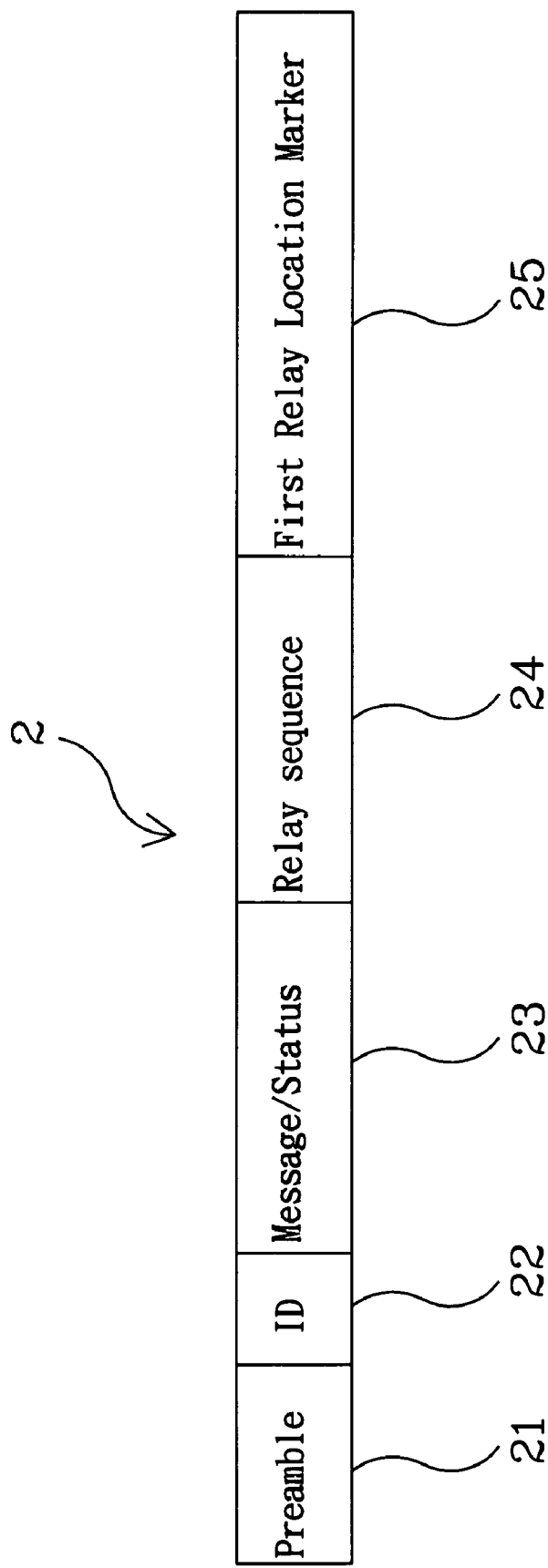
FIG. 2 shows the frame format of a message unit embedded with an ID, a message/status and a relay sequence in fields of the frame.

A system with a plurality of wireless devices according to one embodiment of the present invention is illustrated as in FIG. 1. All of these devices choose to use a same frequency channel, modulation format and coding algorithm for mutually understandable digital communications, and agree to voluntarily assist each other for the purpose of relaying messages. First, wireless device 10 which intends to issue a message transmits a digital message unit henceforth called a "message unit". As shown in FIG. 2, the message unit 2 is of frame format and comprises a plurality of fields, such as preamble 21, ID 22, message/status 23, relay sequence 24 and first relay location marker (FRLM) 25. When the message unit 2 is generated before the wireless device 10 transmits it, the ID 22 of the wireless device 10 and the message/status 23 are implanted into the message unit 2. The Preamble 21 is also possibly required to be included for digital wireless communication. If the wireless device 10 is being operated as a mobile device, the relay sequence 24 is assigned to be 0, and the first relay location marker 25 is left empty. If the wireless device 10 is a stationary or immobile one, such as the base of a cordless telephone, the relay sequence 24 is assigned to be 1, and the first relay location marker 25 is that of the transmitter, i.e., the location of the wireless device 10.

Here we resume that the first (possibly the nearest) receiver is the wireless device 12. If it receives the message unit 2 with a "0" in the relay sequence 24, then the content of the ID 22 is checked. If device 12 recognizes the ID 22 to be the one defined for it to act as the message unit's recipient, it means that the wireless device 12 is the base of the wireless device 10, which further implies that the message unit has reached its destination, and the message/status 23 will be shown, for example on the screen, of the wireless device 12. If the ID 22 is not the one for the wireless device 12, 1 is added to the relay sequence 24, and a meaningful location marker of the wireless device 12 is implanted into the first relay location marker 25. This meaningful location marker could be "7 Fox ST", for example. In addition, the rest of the content of the original message unit 2 remains the same and then retransmitted along with the newly implanted first relay location marker.

The second and the rest of the relay devices, i.e., the wireless device 13 and those afterwards, are operated by adding 1 to the relay sequence 24, and by reproducing and then retransmitting the rest of the content of the message unit 2 they received. In other words, the relay sequence 24 is constantly incremented during the relay process, by which its value is added with 1 each time the message unit 2 is retransmitted.

Finally, the message relay is terminated if any of the following conditions is met. Here we resume that device 14 is making the decision to terminate the relay or not. The first one is to check the content of ID 22 once wireless device 14 receives the message unit 2. If it is a known ID to the wireless device 14, then the message/status 23 and the first relay location marker 25 are displayed on its screen. In this situation, the relaying process is terminated. The second condition to terminate the relay is by the relay sequence 24. When the value of the relay sequence 24 reaches a threshold, e.g., 20, it indicates that the relay process is accumulated up to 20 stations. The relay should therefore be terminated in order to prevent excessive use of radio frequency resources. Thirdly, the relay process is terminated if the ID 22 is the same one as which had been retransmitted previously by device 14 itself within a certain period of time, for instance, 10 seconds. It implies that the message has already been relayed by the wireless device 14 itself and then be retransmitted by a nearby mutually-assisted device. Therefore, the retransmission is not necessary for this time.

In the above cases, each mutually-assisted device assesses whether it is necessary to retransmit the message unit according to the content of ID 22. The base, e.g., the wireless device 14, also determines the termination of the mutual relay by comparing the ID of the message unit 2 with its own ID or IDs it services as a recipient.

There may be two types of ID code: the public and the private ones. Regarding to the fire alarm, anti-thief alarm and community-based information, the commonly recognized ID can be adopted and shared by the public. On the other hand, confidentiality is crucial in order to prevent other people's reproduction or destruction for the private ID code. An individual user aiming at a private purpose can transmit different identification codes session by session. By following a pre-determined algorithm, it is also feasible to mix message/status or relay sequence with the identification code. Thus, the receiver can distinguish whether the message is a genuine or disguised one.

Figure 3:
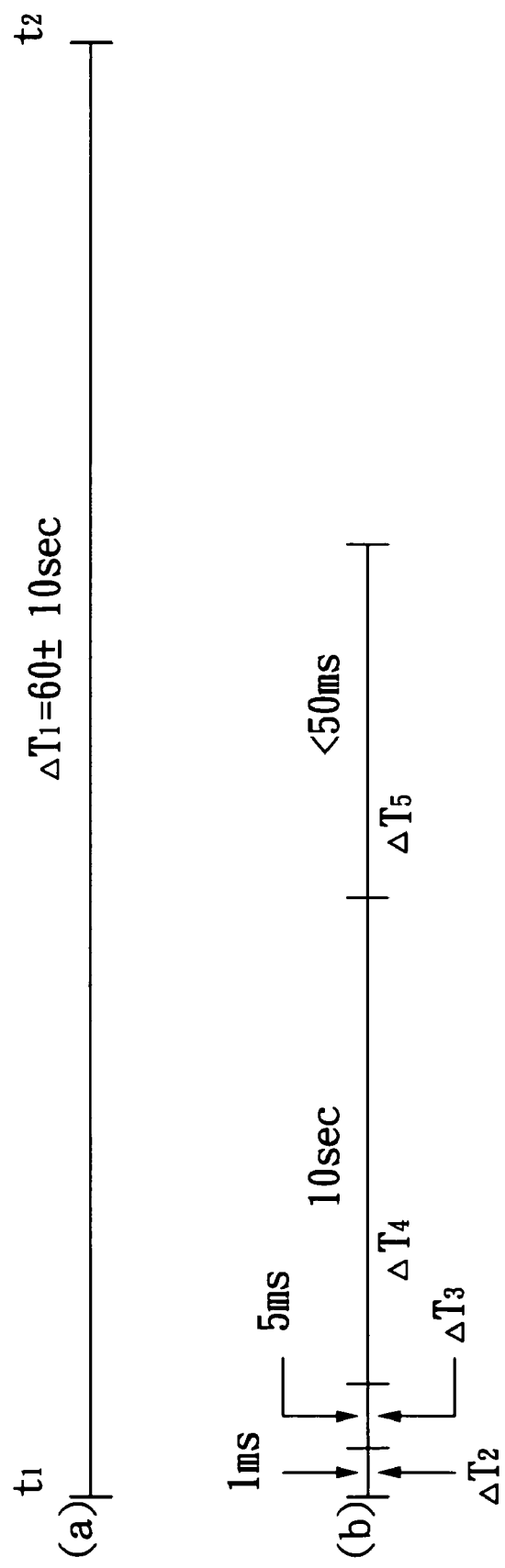
FIG. 3 shows a timing diagram of the control of a message unit to be received and then retransmitted.

Transmission and retransmission among mutually-assisted devices are carried out in an asynchronous manner. If it is necessary, random time intervals can be applied for each retransmission to reduce the collisions problem caused by the simultaneous retransmission among various mutually-assisted devices. An example is illustrated in FIG. 3. FIG. 3(*a*) shows the timing diagram a specific wireless device transmitting two messages consecutively. The interval between the second transmission time $t_2$ and the first transmission time $t_1$ is represented by $\Delta T_1$, which is assumed a random number within 60±10 seconds. FIG. 3(*b*) shows the timing diagram explaining the actions taken by a receiver in close proximity to the message originator shown in FIG. 3(*a*). First, $\Delta T_2$ is the time interval needed for synchronization with the message originator and receiving the message unit 2, which could be about 1 ms. Furthermore, a period $\Delta T_3$ of about 5 ms is retained as internal processing time. A period $\Delta T_4$ then lasts for about 10 seconds, and is reserved for the base to announce a retransmit canceling signal, as will be explained later. Finally, time period $\Delta T_5$ assigned to be smaller than 50 ms, and it is the interval for the relaying device (which does not "own" the message) to retransmit other people's messages.

In a mutually-assisted arrangement, there may be a plurality of devices, each can possibly receive an identical message unit for multiple times from other devices. In the case, the collision sense multiple access (CSMA) method well known to the industry can be applied to resolve the conflicts. If collision does occur and the message could not be read, no retransmission is needed. Since random intervals are applied in a group of devices adjacent to each other, there is only a small chance that a repeatedly transmitted message from a specific transmitter cannot reach its destination.

The channel employed in this system can be any public one, such as CH1 of the international CT1 system. Each single wireless device is not required to be able to receive and transmit message in the same time since the mutually relay system follows the store and forward principle. Moreover, both transmission and reception can be executed on a single channel of the same frequency. Wireless device presently widely used, for example the home cordless telephone, can be a mutually-assisting device. As usual, an unoccupied channel can be picked for the regular telephone conversation use. Whenever the regular phone conversation is not needed, the base can undertake the role discussed above to receive and transmit messages on a public, mutually assisting channel. Nevertheless, the base is regularly switched back to the sharing channel with the handset in order to perform its regular home-use function.

The present invention is further characterized by the temporary participation of a mutually-assisted device. When a visitor enters into a community-based mutually-assisted area, he or she can ask for the participation of the mutual relay system. This is especially beneficial to parking issues. In particular, when a visitor parks a car by the road, he can go to the security manager for registering the mobile ID of the car and possibly an algorithm to identify the authentication of the ID. If something, e.g. theft, happens to the car, the owners can be notified by the security manager with the mutually-assisted system. The security manager could be equipped with a proper card-reader, by this way the mobile handset holder can insert a card, in which ID and algorithm are implanted, into the security card-reader. In this case, the mobile unit becomes a new device of the system after entering the community.

Figure 4:
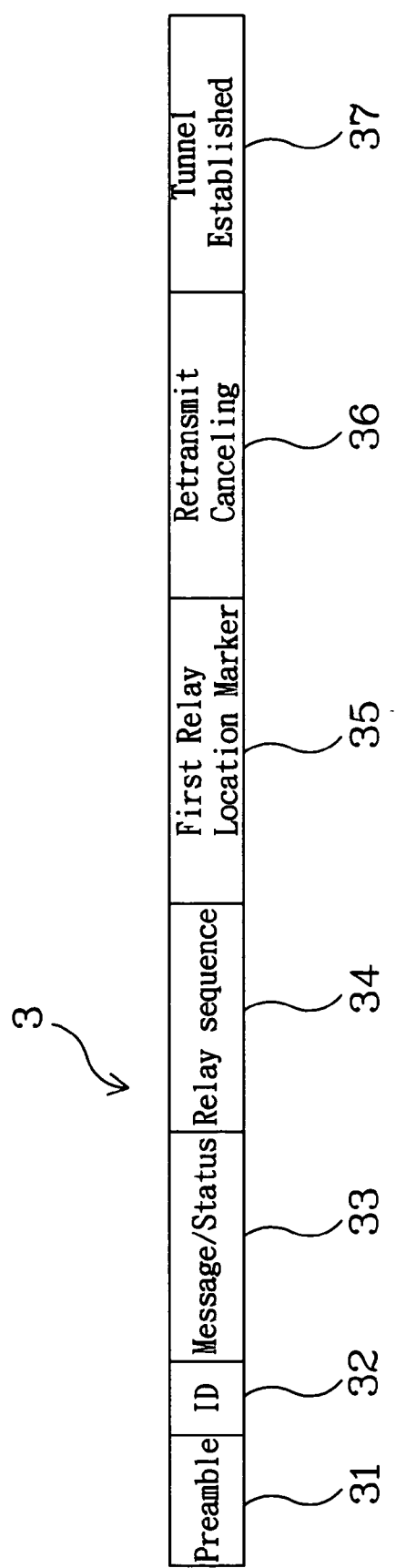
FIG. 4 shows the frame format of a message unit with fields for further options of the relay.

In addition to the method describe above, it is also possible for each member of the mutually-assisted group to determine whether certain retransmission can be omitted while the purpose of communication between the mobile and the base can still be maintained. This is done by adding more fields to the message unit. As shown in FIG. 4, a message unit 3 further comprises fields of retransmit canceling 36 and tunnel established 37 in addition to those of preamble 31, ID 32, message/status 33, relay sequence 34 and first relay location marker 35. The message/status 33 contains a public annotation, a private message and a session key (not shown in the figure). This will be described later.

Figure 5:
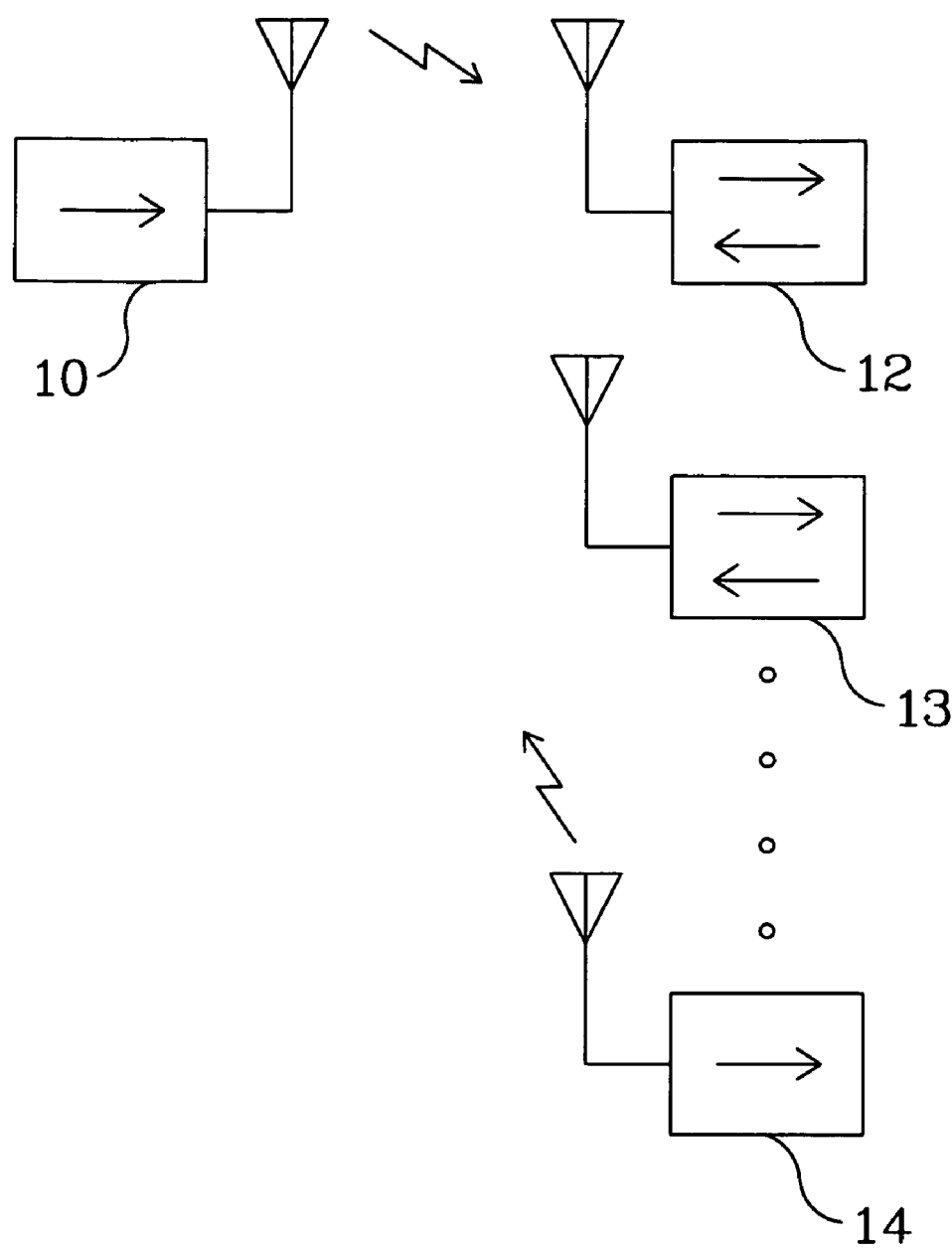
FIG. 5 shows a plurality of wireless devices for illustration of an echo message unit issued from the destination to establish a communication tunnel.

In the message unit 3 shown in FIG. 4, each mutually-assisted device can employ a retransmit canceling field 36 to terminate the relay process. Under specific circumstances, the content of field 36 can directly or instantly instruct a relaying device to continue or discontinue the message relaying. It is more efficient to realize the communication system with the retransmit canceling field 36 to terminate unnecessary relays. For instance, as shown in FIG. 5, a mark is implanted into the retransmit canceling field 36 to act as an "acknowledgement" message after the base 14 receives a message unit transmitted from its own mobile device 10 and possibly relayed by other-units 12 and 13, etc. Once devices in the vicinity of the base 14 received the message carrying proper retransmit canceling word, they will immediately stop the "forward relay" actions which increments relay sequence by 1 for each relay. This will prevent further propagation of the message unit to unnecessary areas.

The retransmit canceling frame 36 not only prevents unnecessary forward relaying, it also provide means of "reverse relay" actions. As will be described later, the content implanted by base 14 for retransmit canceling 36 is actually for devices in the vicinity of the base to authentificate the safe arrival of the message unit to the base. The same authentification key can then be relayed to other devices, using same relay procedures described for forward relays. Now, for those mutually-assisting devices who keep track of previous forward relay records and receive a reverse relay message, they can easily identify whether they are in a position of both forward and reverse relaying paths by comparing messages carrying the same ID and/or same message/status content 33. Based on whether or not they are on a forward and reverse "two-way" path, the devices can decide whether or not to carry out the reverse relaying further. This way the reverse relay will eventually reaches the original mobile unit and establishes a two-way communication mechanism. As a result, a two-way communication channel between the wireless devices 10 and 14 by ways of other mutually assisting devices, such as 12 and 13, is established as long as an "acknowledgement" message is returned to the mobile unit 10.

As shown in FIG. 6, the following discussion explains the transformation of each field in the message unit 3 when it passes through various mutually-assisted devices in FIG. 5. This example is to inform the base 14 about the security status by transmitting a message unit 3 from a wireless device 10 (a mobile). In this case, the message/status field 33 consists of a public annotation 331, a private message 332 and a session key 334. In addition to the session key 334 (assigned temporally for each session), the base 14 and the mobile 10 share the same private key KEY(p) that is not transmitted over the radio channel. When the mobile 10 transmits the message unit 3, an encrypted message is generated by encrypting the plaintext message/status 33 into a ciphered message/status according to the KEY(p) and the session key 334, and then the encrypted message is arbitrarily transmitted among different mutually-assisted devices. In the embodiment shown in FIG. 6, the session key 334 in use is "KEYAA".

There may be two possible ways of encrypting the message/status field 33. For example, the combined private message 332 and the plaintext session key 334 maybe encrypted by KEY(p) first. Then the plaintext public annotation 331 is combined with the encrypted combination and encrypted again with the session key 334. Alternatively, the public annotation 331 can be encrypted with the session key 334 and in the mean time, the combined private message 332 and the plaintext session key 334 are encrypted by KEY(p). There may be other ways of encryption. The purpose here is to hold the private message 332 decryptable only to the mobile-base pair while being able to transport the session key to the destination and keep the session key decryptable only to the base. After encryption, the mobile unit transmits a complete message frame 3 and asks for relaying. Initially, the relay sequence 34 and the value of tunnel establishing 37 are both assigned 0.

After the nearest relay device (possibly the first station) receives the message unit 3, it reproduces and retransmits the rest of the content of the message unit 3. This device does not entail the private key to decipher the secret code of the message/status 33 since it is not the base for the mobile. Therefore, the value of the relay sequence 34 is added by 1, and its own position, "7 FOX ST", is implanted into the first relay location marker 35. The second device and those afterwards (the second station and its following wireless devices) are operated with relay sequence incremented by 1 for each relay. The rest of the content of the message unit 3 is reproduced and retransmitted by each station. The relay sequence 34 is incremented unceasingly until the base, the eleventh station in this case, receives the message unit 3. The wireless device (the base of the mobile) at the eleventh station possesses the same secret key KEY(p) of the mobile. As a result, it is able to decipher the private message 332 and the session key 334 of the encrypted message/status 33 from the message unit 3. Thus the holder of the base realizes the current security status of the source messenger.

When the base receives the message unit 3 from the source transmitter, the private message 332 and the session key 334 are deciphered during the interval $\Delta T_4$ which can be regarded as the waiting-for-retransmit-canceling period for mutually-assisting relaying devices. In addition, a code is implanted into the retransmit canceling field 36. In this case, the session key "KEYAA" of the original message unit 3 is implanted. Furthermore, the rest of the original encrypted message unit 3 is reproduced and retransmitted. A mutually-assisted device adjacent to the base receives the echoed message unit 3' from the base during the interval $\Delta T_4$. With the assistance of the session key 36 out of the echoed message unit 3', this adjacent device is able to decode the public annotation field 331 back to '111'. The public annotation is a mutually agreeable public annotation system for confirmation of receiving. For example, '111' represents 'O.K. received', while 'EEE' may present 'emergency', etc. By comparing the previously received ID 32 and with the confirmation annotation '111', this adjacent device determines that the receiving base has already received its mobile unit's message safely. It therefore decides that it no longer needs to carry out the "forward relay". Instead, it will carry out the "reverse relay" and retransmit the echoed message unit 3' in order to assist the base to establish two-way communication.

Other units adjacent to the base may have received the original message unit 3 but are holding the message during $\Delta T_4$ for retransmission, or others may not receive message unit 3 at all. Upon receiving the echoed message unit 3', all these devices cease to carry out forward relaying so that radio resources in this area are preserved. If the relative positions of the relaying devices between the mobile and the base remain unchanged, it is likely that the echoed message 3' can be relayed one by one, i.e. from the 10th, back to 9th, 8th, etc, if they would voluntarily rebroadcast the echoed message 3', i.e., carry out the reverse relaying. Thus, the message unit 3' can return back to somewhere close to the handset through the original communication path. If the mobile can receive messages, it can assure the communication link by identifying the content of the retransmit canceling field 36 in the echoed message 3'. In this way, a two-way communication link is established. This time after, the mobile may have 1 implanted into the tunnel establishing (TE) field 37. If the condition of TE=1 forces devices not in the way of the reverse relaying path to cease both forward and reverse relaying, devices participating the relaying are very likely those located physically between the mobile unit and the base, according to the likelihood of receiving clear radio signal. This implantation greatly reduces the number of devices participating in a relay session and the spectrum usage in an area. This way we further narrows down the two-way communication path into a two-way communication "tunnel". When the handset transmits the message unit in the future, the established communication 'tunnel' can likely be followed again.

The session key 334 can be different for each time. Further, only the handset and the base have the secret key KEY(p). That is, only the base can decipher the encrypted message unit and the session key 334. It is not easy for a third party to decipher the session key without KEY(p), nor is for the third party in pretending the transmitter. Thus, the communication security and reliability are guaranteed.

In addition to maintaining a reliable communication quality, the above technology enables two-way communication, establishes a virtual communication tunnel, and avoids unnecessary waste of communication resources. If the virtual tunnel of the propagation for the message is not set up, the message transmission can be directed toward everywhere from the center of the mobile device during a relay session. Nevertheless, since the base is only situated in one locale, the relay transmission towards other directions is unnecessary. By establishing the virtual transmission tunnel, communication resources can be effectively utilized. If a mobile set determines to set TE=1, wireless devices that are not located along the communication tunnel will not participate in the relay process. Consequently, the unnecessary waste of communication resources can be avoided.

The usage of a same identification code is essential in establishing the tunnel. The mobile device uses one identical ID for consecutive transmission sessions. When the base retransmits the echoed message 3' through the communication tunnel, each mutually-assisted device can compare IDs of the newly-received message with its previous receiving records. Therefore, the mutually-assisted device is able to determine its role as a forward relayer or reverse relayer, or both, according to its past transmit and receive history.

Under certain specific circumstances, e.g., the variation of electric waves environment, or transmissions originated from different handsets in the adjacent area, the busy status of each relay device varies. Therefore, the relay device may not receive messages because it is in a busy status. As a result, a virtual communication tunnel may temporarily out of service. The handset, therefore, cannot receive any response. In order to recover from this situation, the field of communication tunnel establishing 37 has to be returned to 0. That is, the device asks for help from other relaying devices. This is a way to reestablish the communication tunnel.

Figure 7:
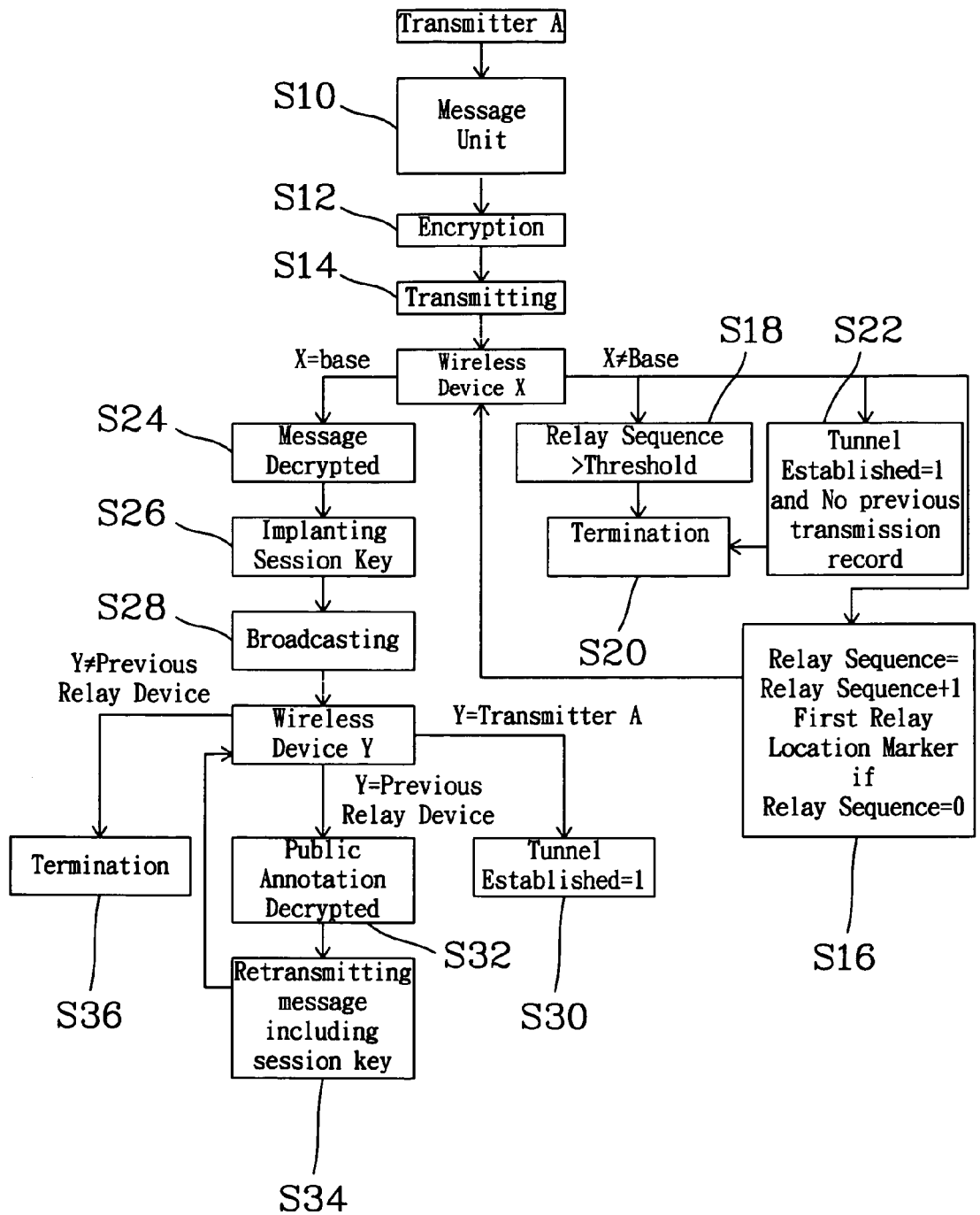
FIG. 7 is a flow chart showing the steps of generation, transmission, and receiving of a message unit.

By following the above principle, FIG. 7 depicts the flowchart of the complete life cycle of a message unit from its creation through its ceasing or being retransmitted. Transmitter A generates a message unit in step S10. This message unit includes a private message and a session key. After step S12, the private message and the session key are transformed into encrypted codes. Afterwards, the message unit is transmitted in step S14. Then, the message unit is received by a wireless device X. If the wireless device X is not the base of the transmitter A, the value in each field of the message unit determines the response of the wireless device X. When relay sequence of the message unit is smaller than a specific value, i.e., a threshold, step S16 is followed to add 1 to the relay sequence. It is more typical that the value of the relay sequence is 0. It means that the wireless device X is the first relay device for the message unit. In addition to adding 1 to the relay sequence, the location of the wireless device X is implanted into the field of the first relay location marker. Data in other fields of the message unit are also reproduced and retransmitted. As a result, the relay transmission is repeated. When the relay sequence of the message unit after step S14 is larger than the preset threshold, as indicated by step S18, the message unit has been transmitted through many relay devices, but has not been received by the base. In order to avoid the unnecessary waste of communication resources, the relay process is terminated in step S20. Step S22 indicates another condition, i.e., the field of communication tunnel established in this message unit is 1. According to other fields of the message unit, such as ID, the wireless device X assets that the original message unit of the received message unit has not been transmitted before. This indicates that the wireless device X is not on the same communication tunnel through which the message is previously transmitted. In other words, for the wireless device X, it is unnecessary to transmit this message unit, and the relay transmission of this message unit is terminated in step S20.

On the other hand, if the wireless device X is the base of the transmitter A, the secret code of the received message unit is transformed into the private message or the session key in step S24. In addition, the retransmit canceling field 36 of the message unit is implanted with the session key in step S26. This implantation signifies the received status of the message unit by the base. Furthermore, step S28 is proceeding, by which the wireless device X reproduces data in other fields of the message unit and then retransmits what have been reproduced.

A wireless device Y adjacent to the wireless device X then receives the message unit. The role of the wireless device Y influences the variation of the message unit. If the wireless device Y is the transmitter A, step S30 is proceeding in order to implant 1 to the field of communication tunnel established within the message unit. If the wireless device Y is a previous relaying device, step S32 should proceed in order to confirm the safe arrival of the original message to its destination, and then to retransmit the message including the session key in step S34 to carry out the reverse relay. This process is repeatedly conducted. If the wireless device Y is not a previous relaying device, the transmission of the session key-implanted message unit is terminated in step S36. This step can be identified by the ID of the message unit or by comparing data in other fields.

Figure 8:
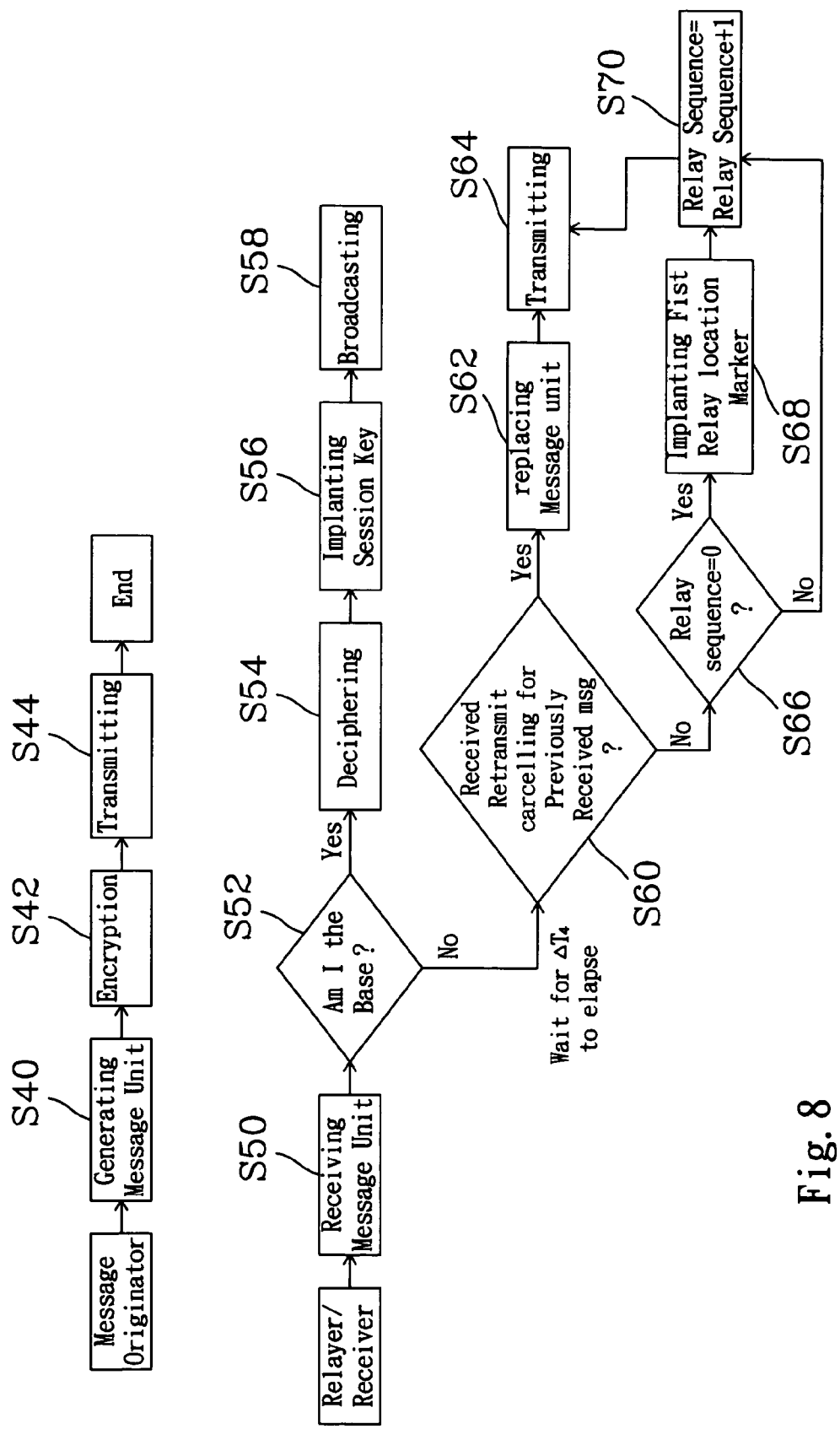
FIG. 8 is a flow chart showing the operations of a plurality of wireless devices.

FIG. 8 further depicts the roles of devices in this mutually-assisting system and the flowchart for their reactions to different situations according to the message they receive. Depending on different circumstances, each wireless device can be regarded as either a message originator or a relayer/receiver for ease of explanation. The former generates the original message unit in step S40. The secret key of this device encrypts the content of the message unit in the encryption process S42. As a result, others cannot decipher the message unit. After step S44 (the transmission of the message unit), the operation of the transmitter is terminated. On the other hand, a relayer/receiver is a device other than the message originator which takes the role of either a relayer or the recipient of the message unit. After the relaying device receives a message unit, it can distinguish whether it is a message transmitted from its own base. These are step S50 and step S52. The distinction is based on whether the relaying device can recognize the ID of the message unit. If the result of step S52 is positive, it means that the relaying device is the base of the transmitter. Step S54 is proceeding in order to decipher the private message and the session key in the message unit. Afterwards, the session key is implanted into the field of the retransmit canceling in the message unit in step S56. This message is then broadcasted in step S58 in order to stop further forward relay and carry out the reverse relay.

The above discussion focuses on whether or not the relaying device acts as a base. If the result from step S52 is negative, the relay device needs to wait for $\Delta T_4$ to elapse and try to receive a retransmit canceling message for the message previously received. This decision is made in step S60. If a retransmit canceling is received in $\Delta T_4$, it means that the relaying message unit has arrived at its destination thus the forward relay is cancelled. Meanwhile, the relay device replaces the previous received message with the current one including the retransmit canceling key in step S62 and carries out the reverse relaying. The transmission of the message unit after the replacement process is in step S64. If the result of step S60 is negative, it means that the base has never received this message. This device further examines whether the field of the relay sequence in the message unit is 0 in step S66. Through conducting this step, the relaying device can recognize whether it is the first receiver of the message unit. If the result is positive, step S68 is preceded, by which the first relay location marker of the message unit is implanted with the location of the relaying device. If the result of step S66 is negative, the relaying device directly adds 1 to the relay sequence in the message unit in step S70. At the same time, other fields of the message unit are reproduced and retransmitted in step S64.

Message originators and the relayer/receivers are indistinguishable in construction. They simply take different roles when different situations or needs arise.

Query is an application available for a mutually-assisted device in this system, most likely a mobile one, to access surrounding publicly available information. This is useful when, for example, a vehicle wants to find its location in an unfamiliar area. A publicly recognized service device may broadcast its location in a precise way so that a mobile device within its radio service range can receive the signal and find its location in a literal way, if the message can be received or decoded properly. This is an inexpensive way of offering positioning service when the precision requirement is within, for example, hundreds feet. This will be further useful when a busy clinic or restaurant offer services in a first-in-first-serve fashion or by a pre-registered order. The clinic or restaurant can always broadcast its availability, waiting time or service sequence number. Any patient or customer using a mutually-assisted device in this system may find its status of being served even when approaching the clinic or restaurant within its radio service range or within a multiple relayed radio range. This will be valuable, in particular, if parking is a headache.

Depending on its nature, query can be carried out in either an active or a passive mode. For example, a vehicle trying to find its location may transmit a message unit with its message/status field inserted with "REQ FOR LOC" plaintext indicating that it is asking for a literal positioning service. Nearby terminals then recognize this request and will not re-transmit the message unit as usual for relaying services. Instead, receiving devices capable of broadcasting their positions echo the request with their locations shown in the message/status column. Different responding devices differ in responding time by a time period $\Delta T_5$ so that responding signals from different parties do not collide, as was the rule used for normal relaying. The querying device then receives and judges for the most reliable positioning data for its own use. This is a typical "active" query session. A passive query session is used, for example, for a busy hospital or big restaurant. They could not handle large active query traffics from customers so that they simply constantly broadcast publicly needed status data in plaintext in the message/status field so that terminals within its transmitted range can use. These message units may further be voluntarily relayed by nearby devices so that devices in a greater area can utilize the service. In these cases, the mobile devices will only listen. They do not transmit and ask for responses.

Through the operation disclosed in the present invention, it is able to break through the limited communication range of a wireless device. The system is characterized by a unique common transmission/reception and termination protocol with the relay of a plurality of wireless devices to provide holders of the wireless devices mutually assisted communication services. Thus, a longer-distance or a larger-area community-based message exchange can proceed without relying on the public communication network, or on applying for a licensed channel of radio spectrum. In order to facilitate the longer-distance communication, those who participate in the system only need to possess the transmission/reception device permitted by the current legal regulation. Users can even utilize the communication device designed for ordinary home use. In the present invention, mutual assistance can even be achieved by modifying the software of existing devices.

In another aspect, the communication is safe and reliable by the two-way transmission between the handset and the base as well as the message encryption.

Based on the advantages described above, the present invention makes the wireless communication convenient and reliable for many simple, local, or community-based applications, such as the automobile anti-thief alarm, children's SOS handset, fire alarm, security alarm, the messenger for the arrival of the garbage truck, and communication between the different floors or units of the same or different buildings, etc. It will be apparent to those skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A mutually-assisted proximity informer system with a plurality of wireless devices having a same modulation, format and coding algorithm over a same frequency channel, said system comprising:

a message source among of said a plurality of wireless devices for delivering a message;

an original message unit in a frame format and embedded with an ID, a message/status and a relay sequence for a relay process of said message generated and transmitted by said message source;

at least a relaying device among of said a plurality of wireless devices for said relay process, wherein said original message unit is received and transmitted voluntarily one by one with a message unit in said frame format by said at least a relaying device until a termination of said relay process, and said relay sequence count is constantly incremented during the relay process; and a destination out of said a plurality of wireless devices for receiving the message.

2. A system according to claim 1, wherein said original message unit comprises a first relay location marker, and if said message source is a mobile one, then said relay sequence is implanted with a '0' and said first relay location marker is left empty; otherwise said relay sequence is implanted with a '1' and said first relay location marker is implanted with location of said message source.

3. A system according to claim 1, wherein said frame format comprises a field of first relay location marker, and any one of said at least one relaying device which receives said message unit carrying relay sequence count of 0 implants its location into said first relay location marker frame of said message unit which it receives, then retransmits said modified message unit.

4. A system according to claim 1, wherein said termination is executed when said relay sequence reaches a threshold.

5. A system according to claim 1, wherein said termination is executed when said ID of said original message unit is a known one to said at least a relaying device which receives said message.

6. A system according to claim 1, wherein said termination is executed when said ID of said message unit is said one that has been transmitted by the same relaying device previously within a certain period of time.

7. A system according to claim 1, wherein said at least a relaying device waits for a time period before retransmission so that another message unit that includes retransmit canceling frame can be announced.

8. A system according to claim 1, wherein said at least a relaying device is inserted with a randomly chosen interval for retransmitting the message unit to reduce collisions caused by the simultaneous transmission among said relaying devices.

9. A system according to claim 1, wherein said message is encrypted in said original message unit so that only said destination device can decrypt its original content.

10. A system according to claim 9, wherein said message is encrypted with a session key.

11. A system according to claim 10, wherein a session key is assigned each time for each relay session.

12. A system according to claim 10, wherein said session key decrypted by said destination device is implanted in a frame of said original message unit and said modified message unit is broadcasted by said destination device so that said session key is made available to other mutually assisting devices.

13. A system according to claim 10, wherein a two-way communication link between said message source and said destination is established by a forward and reverse relay process.

14. A system according to claim 13, wherein said reverse relay is carried out by each member device of said communication path when public annotation is decryptable with the aid of said session key.

15. A system according to claim 13, wherein said frame format comprises a field of tunnel established commanding whether said communication tunnel is to be established.

16. A system according to claim 13, wherein commanding tunnel established value to be 1 eliminates member devices not situated along both said forward and reverse relay pathes from unnecessary relaying and avoid excessive spectrum usage.

17. A system according to claim 9, wherein said message is encrypted with a private key shared between said message source and said destination.

18. A system according to claim 1, further comprising an echo message unit delivered from said destination to said message source for notifying arrival of said message.

19. A system according to claim 1, wherein said frame format comprises a field of retransmit canceling for notification of said termination.

20. A method for a mutually-assisted proximity informer system with a plurality of wireless devices having a same modulation, format and coding algorithm over a same frequency channel, said method comprising the steps of:
generating and transmitting an original message unit in a frame format and embedded with an ID, a message/status and a relay sequence for delivering a message to a destination by a message source among of said a plurality of wireless devices;
performing a relay process of receiving and transmitting voluntarily one by one with a message unit in said frame format generated by at least a relaying device among of said a plurality of wireless devices for said message, wherein said relay sequence is constantly incremented during said relay process;
and terminating said relay process.

21. A method according to claim 20, further comprising a step of implanting into said original message unit with a first relay location marker, wherein if said message source is a mobile one, then said relay sequence is implanted with a '0' and said first relay location marker is left empty; otherwise said relay sequence is implanted with a '1' and said first relay location marker is implanted with location of said message source.

22. A method according to claim 20, further comprising a step of implanting a first relay location marker by said at least a relaying device with its location when said relay sequence is 0 if it has a different ID from that of said original message unit.

23. A method according to claim 20, further comprising a step of determining if said relay sequence reaches a threshold for terminating said relay process.

24. A method according to claim 20, further comprising a step of determining if said ID of said original message unit is a known one to said at least a relaying device for terminating said relay process.

25. A method according to claim 20, further comprising a step of determining if said ID of said original message unit is the one that has been transmitted by the same relaying device previously within a certain period of time for terminating said relay process.

26. A method according to claim 20, further comprising a step of encrypting said message in said original message unit so that only said destination device can decrypt its original contant.

27. A method according to claim 26, wherein a session key is encrypted in said message/status.

28. A method according to claim 27, wherein a session key is assigned each time for each relay session.

29. A method according to claim 27, further comprising the steps of:
generating and delivering an echo message unit from said destination to said message source; and
decoding a public annotation from said echo message unit with said session key.

30. A method according to claim 29, further comprising a step of implanting with a '1' into a tunnel established field of said echo message unit for establishing a communication tunnel between said message source and said destination, wherein said communication tunnel links said message source and said destination through said at least a relaying device in said relay process for said original message unit.

31. A method according to claim 30, wherein any one of said relaying devices not linked with said communication tunnel will not join with other relay process for said communication tunnel when said tunnel established is embedded with a '1'.

32. A method according to claim 31, further comprising a step of resetting said tunnel establishing to be 0 to reestablish a link once said communication tunnel is broken.

33. A method according to claim 26, wherein a private key is shared only between said message source and said destination.

34. A method according to claim 20, further comprising a step of inserting a time period for said at least a relaying device so that before the time period elapses a message unit including said retransmit canceling signal can be announced.

35. A method according to claim 20, further comprising a step of generating a randomly chosen interval for said at least a relaying device to transmit said message unit.

36. A method according to claim 20, further comprising a step of implanting with a mark into a retransmit canceling field of said message unit for immediately terminating said relay process.

37. A method according to claim 20, further comprising a step of registering a new wireless device for joining into said mutually-assisted proximity informer system.

38. A method according to claim 20, further comprising the steps of:
- encrypting a public annotation with a session key; and
- encrypting a private message and said session key with a private key;
- wherein said public annotation can be decoded by said mutually-assisted devices only after said session key is decoded by said destination.

39. A method according to claim 20, further comprising a step of comparing said messages previously received and transmitted with a message unit carrying a retransmit canceling by a mutually-assisted device to determine if it is on a forward and reverse relay path.

40. A method according to claim 20, further comprising a step of implanting with a mark into a retransmit canceling field of said message unit so that said mutually-assisted devices which keep track of previous forward relay records and receive a reverse relay message can identify whether they are at a position of both forward and reverse relaying path.

* * * * *